2,890,189

ALKALI SOLUBLE RESINS AND COMPOSITIONS CONTAINING THE SAME

Sylvan O. Greenlee, Racine, Wis., assignor to S. C. Johnson & Son, Inc., Racine, Wis.

No Drawing. Application June 14, 1954
Serial No. 436,683

12 Claims. (Cl. 260—29.2)

This invention relates to synthetic resins and compositions containing the same. More particularly, it relates to alkali soluble resins suitable for use in removable protective coating compositions. The resins of this invention in regulated proportions are useful in the manufacture of paints, varnishes, adhesives, fabric-treating compositions, etc. Moreover, they are particularly well-suited for use in removable protective coating compositions.

In addition to wax, the use of minor amounts of resins in self-polishing non-permanent type coating compositions has been appreciated for many years. It has been found, however, that in order to obtain a composition which upon application would produce a film having maximum gloss and hardness, a resin must constitute a major proportion of the solids content of the composition. Resins suitable for use in major amounts in such compositions must have certain peculiar properties. Since nearly all the self-polishing floor coating compositions are water emulsions or dispersions, the resin must be readily dispersible in water as well as being compatible with the other components of the formulation. The resin must impart to the formulation good flow characteristics and result in a film having high gloss as well as water and mar resistance. The water resistance of the film resulting from the application of the formulation should be sufficient to allow damp mopping with cold or tepid water and yet not resistant to such a degree as to prevent its removal with hot water and soap or detergents. Finally, the resin should not result in a film which is tacky or slippery.

Heretofore, most resins have been prepared specifically for the paint and varnish, or plastics industries. These resins are necessarily of a high molecular weight and have a high water resistance, making them difficult, if not impossible, to disperse in aqueous media in the formulation of removable coatings. Certain naturally occurring resins have some desirable characteristics for incorporation in removable protective coating compositions, but are not completely satisfactory and are often difficult to obtain.

In accordance with this invention, a new resin has been discovered which possesses all the desirable properties previously mentioned and which is less expensive than the naturally occurring resins used heretofore. This resin is prepared by the incomplete reaction of a dibasic acid or its anhydride with a resinous polyhydric alcohol having the following general formula:

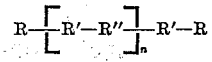

in which R is a hydroxy alkyl radical of 2 to 12 carbon atoms derived from a compound containing an ether-forming group, R' represents a dihydric phenol residue, R" constitutes the residue of an aliphatic coupling agent, and $n$ equals 0, 1 or 2.

The dihydric phenols suitable for use in making the resinous polyhydric alcohols may be poly-nuclear or a mono-nuclear material such as resorcinol, hydroquinone, catechol. Bisphenols having the nuclei thereof joined by an alkyl group of from 1 to about 10 carbon atoms are conveniently used in the preparation of the resinous polyhydric alcohols herein described. Alkylidenediphenols such as methylidenediphenol and higher alkylidenediphenols prepared by the condensation of ketones with phenols are eminently suitable. Methylidenediphenol is prepared by reacting phenol with formaldehyde under conditions where the formaldehyde is controllably released as from such compositions as methylol ureas. The reaction of acetone with phenol gives a mixture of p,p'-isopropylidenediphenol along with small amounts of the corresponding ortho isomers. Likewise, the reaction of cyclohexanone with ortho cresol would give the cyclohexylidenedi-o-cresol. Examples of other suitable polynuclear dihydric phenols which may be advantageously employed are p,p'-dihydroxybenzophenone, p,p'-dihydroxydiphenyl, p,p'-dihydroxydibenzyl, any of the dihydroxyanthracenes, dihydroxynaphthalenes, sulfones such as bis(p-hydroxyphenyl)sulfone, or other phenols wherein the nuclei are coupled by sulfur or oxygen atoms.

The coupling agents advantageously used in building up the molecular structure desired for the resinous polyhydric alcohols should be bifunctional in their reactions with the dihydric phenols in the presence of alkali. In this respect, a material is considered bifunctional when it is capable of forming a pair of ether linkages with two phenolic hydroxyl groups. It has been found that suitable coupling agents of this description should be based on an aliphatic structure having no more than about 10 carbon atoms and that such agents fall within three general categories: epihalohydrins, diepoxides, and dihalides, with the ethers of these materials also being suitable.

Epichlorhydrin is bifunctional in reactions with dihydric phenols in that the epoxide and the chloride each reacts with a phenolic hydroxyl group in the presence of alkali to form ether linkages between the epichlorhydrin residue and that of the dihydric phenol. Epihalohydrins other than epichlorhydrin such as epibromohydrin and those structures in which one of the carbon atoms has been replaced by an ether oxygen such as 2,3-epoxypropyl-2-hydroxy-3-chloropropyl ether also may be used.

Since the epoxide group reacts with the phenolic hydroxyl group to form an ether linkage, diepoxides may be used as the bifunctional coupling agents in reactions with dihydric phenols. Exemplary diepoxides are 1,2-epoxy-3,4-epoxybutane and those in which one of the carbon atoms has been replaced by an ether oxygen such as bis(2,3-epoxypropyl)ether. The term epoxide as used throughout this patent description refers to ethylene oxides or those epoxides in which the oxygen is linked to adjacent carbon atoms to form a three-membered ring.

The coupling agent may also be an aliphatic dihalide since these materials are also bifunctional with respect to the dihydric phenols. It has been found that dihalides in which one of the carbon atoms has been replaced by an ether oxygen are useful in preparing the resinous polyhydric alcohols. Exemplary dihalides are 1,2-dichloroethane, 1,3-dichloropropane, 1,2-dibromoethane, 1,3-dibromopropane, 1,10-dichlorodecane, the dihalides of corresponding olefins such as 1,4-dichlorobutene-2 and ethers such as bis(2-chloroethyl)ether, bis (beta-chloroisopropyl)ether, and bis(2-chloroethyl)formal.

The materials suitable for use in forming the terminal hydroxy alkyl radicals of the polyhydric alcohols may be bifunctional, but in such case, preferably react with the phenolic hydroxyl groups to form ethers through only one of the functional groups. Materials such as those described hereinabove as being suitable for use as coupling agents may be employed, but because of the difficulty of avoiding polymerization, it is preferred that materials which are mono-functional, with respect to the dihydric phenols, be employed. As with the coupling agents, one of the carbon atoms of the terminal hydroxyalkyl radicals may be replaced by an ether oxygen. Suitable monofunctional hydroxy alkyl compounds are the hydroxy monoalkyl halides and the monoepoxides. The hydroxy monoalkyl halides include the monohalides which contain 1 or 2 hydroxyl groups and from 2 to about 12 carbon atoms. Illustrative compounds are ethylene chlorhydrin, glycerol monochlorhydrin, 3-hydroxypropyl chloride, and beta-hydroxyethyl beta-chloroethyl ether. Suitable monoepoxides which may be employed should contain from 2 to about 10 carbon atoms, one of which also may be replaced by an ether oxygen atom. Suitable monoepoxides which may be employed are ethylene oxide, propylene oxide, and 1,2-epoxypropyl 1,2-propenyl ether.

Esterification of the polyhydric alcohols is suitably carried out by means of certain dibasic acids and, where available, their corresponding anhydrides. Suitable anhydrides include the cyclic anhydrides such as phthalic, tetrahydrophthalic, succinic, maleic, adipic and glutaric. The dibasic acids which may be used include fumaric acid and diglycolic acid as well as the dibasic acids corresponding to the enumerated anhydrides.

A typical resinous polyhydric alcohol is illustrated by the reaction product of 2 mols of p,p'-isopropylidenediphenol in the presence of alkali with 1 mol of epichlorhydrin and 2 mols of ethylene chlorhydrin to give the following composition:

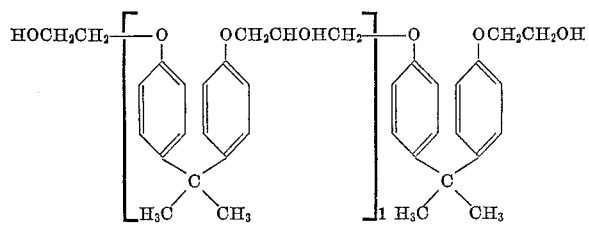

Such resinous polyhydric alcohols are then reacted with dibasic acids or their anhydrides such as fumaric acid or maleic anhydride under conditions which promote partial esterification, leaving sufficient unreacted acid groups in the product to give an acid value in the range of 40 to 100. The acid value as used herein is defined as the number of milligrams of potassium hydroxide which is equivalent to the acid content of 1 gram of the sample. Theoretically, the structure of the final product, using the above resinous polyhydric alcohol could be:

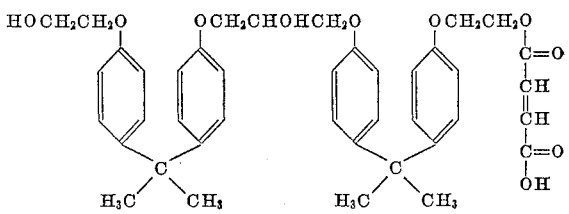

In practice, however, the reaction products are mixtures in which some of the molecules of the resinous polyhydric alcohol are esterified through different alcoholic hydroxyl groups or by more than one molecule of dibasic acid.

In preparing the synthetic esters of this invention, there is some latitude possible in the selection of the alcohols and dibasic acids or anhydrides. The only limitations which exist are those which would be required to produce a product having an acid value of 40 to 100 in order that the necessary alkali solubility may be attained. It follows that the materials used in preparing the resinous polyhydric alcohols, i.e., the dihydric phenols, coupling agents, and hydroxy-alkyl compounds, may also be widely varied.

The reaction of a phenolic hydroxyl group with an alkyl halide forms an ether linkage by the well known Williamson ether synthesis:

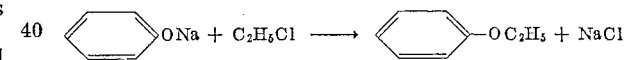

Phenol also reacts with an epoxide group to form a hydroxy ether:

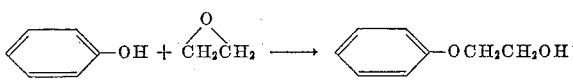

It will be seen that these two typical reactions may be used in building up the structure of the resinous polyhydric alcohols. For example, the reactions leading to a typical resinous polyhydric alcohol prepared from 2 mols of p,p'-isopropylidenediphenol, 1 mol of dichlorodiethyl ether, and 2 mols of ethylene chlorhydrin are as follows:

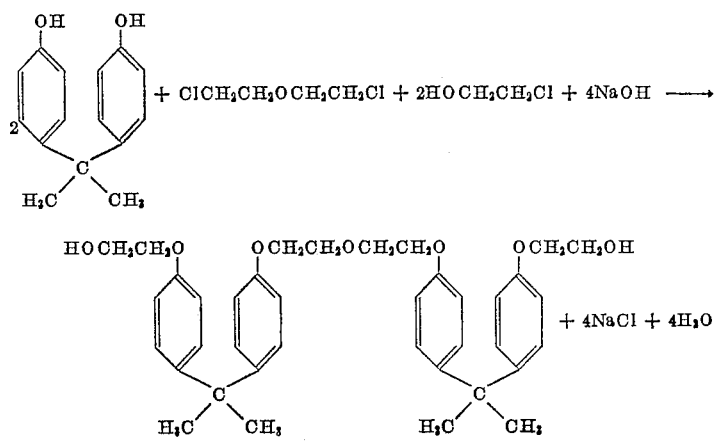

The reaction of 2 mols of ethylene oxide with 1 mol of cyclohexylidenedi-o-cresol would give the following structure:

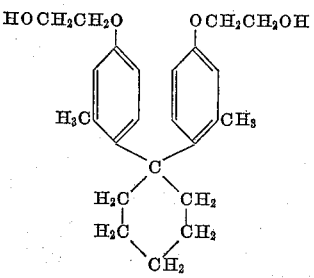

The reaction of a dibasic anhydride with a resinous polyhydric alcohol may be illustrated by the reaction of 1 mol of maleic anhydride with 1 mol of the bis-(beta-hydroxyethyl)ether of p,p'-isopropylidenediphenol:

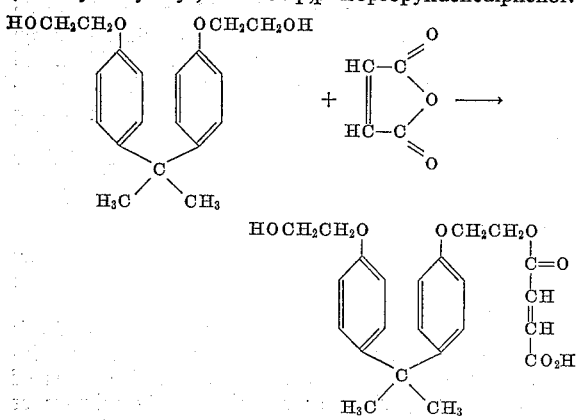

The reaction of a dibasic acid with a resinous polyhydric alcohol to give a resinous synthetic ester may be illustrated by the reaction of 1 mol of fumaric acid with a molar portion of the reaction product of 2 mols of p,p'-isopropylidenediphenol with 1 mol of epichlorhydrin and 2 mols of ethylene chlorhydrin:

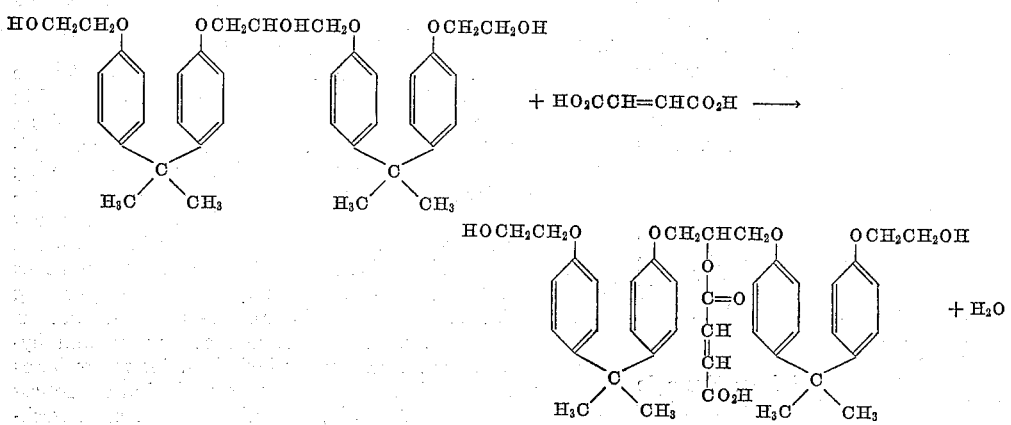

It should be understood that the illustrative reactions set forth are not without side reactions although by properly adjusting the molar proportions of the reactants and the reaction conditions, the desired products may be obtained in predominant amounts. In the formulation of self-polishing coating compositions based on the new resinous synthetic esters of this invention, it has been found that the side reaction products are not present to such a degree as to be detrimental to the desired performance of the coating.

Although in the illustrative reactions above, the value of $n$ is 0 and 1, in the general formula for the polyhydric alcohols,

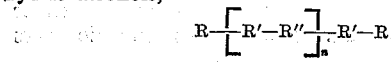

its value depends upon the reactants employed together with the properties desired. $n$ may equal 0, 1 or 2, compounds having higher values being insufficiently soluble in alkali solutions or coatings prepared therefrom having unsatisfactory balance of water-resistance properties. Some latitude in choosing the optimum combination of ingredients is desirable. When a given performance is desired in two resins which are prepared from different dihydric phenols, it may be necessary to vary the ratio of ingredients in order to produce products having molecular weights of such values as to give the desired balance of performance characteristics. Similarly, two resinous synthetic esters having the same hydrophilic properties, one of which is based upon the use as a coupling agent of epichlorhydrin, the other being based upon the use of bis(beta-chloroethyl)ether, would not necessarily be obtained by using the same molar proportions of reactants.

Because of the upper limit for the value of $n$, the preferred resins of this invention will contain no more than 3 dihydric phenol residues per molecule. But because of the plethora of coupling agents and terminal hydroxyalkyl radicals possible, the hydroxyl groups per molecule may range up to about 8 in number.

Generally, the resinous synthetic esters which are suitable for use in the self-polishing coating compositions of this invention have softening points falling within the range of 60° to 100° C. Softening points as used throughout this description were determined by the Durrans mercury method (Journal of Oil and Colour Chemists' Association, 12, 173–5 [1929]). The amount of dibasic acid or anhydride may also be used to adjust the softening point of the resins of this invention, providing some esterification of both of the carboxyl groups. It is important, however, to maintain a sufficient amount of acidity in the composition to provide the desired solubility in alkali solutions. It has been found that the requisite acidity for this purpose is represented by an acid value in the range of 40 to 100. Since the acidity of the resinous synthetic esters of this invention is obtained by the use of dibasic acids, it follows that in the final chemical structure of the resin there should be present at least one ester linkage for each free carboxyl group.

The following are illustrative examples of the preparation of the alkali-soluble resins of this invention, parts being given by weight unless otherwise indicated.

*Example I*

To a constantly agitated solution of 684 parts of p,p'-isopropylidenediphenol dissolved in 1200 parts of water containing 120 parts of caustic soda was added 480 parts of ethylene chlorhydrin and a solution of 120 parts of caustic soda dissolved in 500 parts of water over a period of 15 minutes, during which time the temperature increased from 70 to 96° C. The reaction mixture was held at 91-96° C. for 1 hour and 65 parts of 37% hydrochloric acid was added and the mixture stirred an additional 30 minutes. Agitation was stopped and the aqueous layer was decanted. The product was washed 3 times by stirring 30 minutes with 800 parts of water at 90-95° C., removing the water each time by decantation. The product was dried by heating to 130° C. to give 895 parts of a soft resinous polyhydric alcohol. A mixture of 158 parts of the product and 80 parts of fumaric acid was stirred at 210-215° C. for 3 hours to give a hard, clear resin having an acid value of 77 and a softening point of 79° C.

*Example II*

The procedure of Example I was repeated except that 71.5 parts of maleic anhydride was substituted for the fumaric acid. The mixture was stirred at 190-197° C. for 2½ hours to give a hard, clear resin having an acid value of 69 and a softening point of 74° C.

*Example III*

The procedure of Example I was repeated, substituting 102 parts of phthalic anhydride for the fumaric acid and stirring at 195-197° C. for 2¼ hours. A hard, clear resin having acid value of 75 and a softening point of 69° C. was obtained.

*Example IV*

To a constantly agitated solution of 684 parts of p,p'-isopropylidenediphenol dissolved in 1500 parts of water containing 120 parts of caustic soda was added 139 parts of epichlorohydrin at 70° C., and with continuous agitation, the reaction temperature was raised to 90-95° C. and held for 1 hour after all the epichlorhydrin had been added. The agitation was stopped and the aqueous layer removed by decantation. Agitation was started and a solution of 120 parts of caustic soda dissolved in 1000 parts of water was added, after which 242 parts of ethylene chlorhydrin was added over a period of 10 minutes during which time the temperature was increased from 77° to 96° C. Another solution of 60 parts of caustic soda dissolved in 500 parts of water was added and the temperature of the reaction held at 90-95° C. for 1 hour, when 200 parts of 37% hydrochloric acid was added and agitation continued at 90-95° C. for one-half hour. The aqueous layer was then removed by decantation and the product washed 3 times using 2000 parts of hot water for each wash. The resin was dried by heating to 130° C. to give 645 parts of a resinous polyhydric alcohol melting at 65° C.

*Example V*

A mixture of 90 parts of the alcohol from Example IV and 18.5 parts of maleic anhydride was stirred at 150-190° C. for 1 hour to give a hard, clear resin having an acid value of 51 and softening point of 80° C.

*Example VI*

A mixture of 150 parts of the alcohol from Example IV and 46 parts of phthalic anhydride was stirred at 190-195° C. for 1⅓ hours to give a hard, clear resin having an acid value of 71 and a softening point of 84° C.

*Example VII*

To 1140 parts of p,p'-isopropylidenediphenol dissolved in 1500 parts of water containing 200 parts of caustic soda was added 358 parts of bis(beta-chloroethyl)ether and the reaction mixture was raised to 150° C. and held at this temperature for 8 hours (a closed pressure reactor provided with agitation was required for this preparation). After the mixture had cooled to 98° C., the water layer was removed by decantation and the product washed 3 times with hot water in the usual manner. This intermediate resinous product was dried by heating to 120° C. to give 1235 parts of a hard brittle resin.

To a constantly agitated solution of 789 parts of this resinous product dissolved in 1100 parts of water containing 120 parts of caustic soda was added 242 parts of ethylene chlorhydrin over a period of 8 minutes at 77-95° C. The temperature was maintained at 90-95° C. for 2 hours when 57 parts of 37% hydrochloric acid was added and the reaction mixture stirred an additional hour at 90-95° C. Then the aqueous layer was decanted and the product washed 4 times using 2000 parts of hot water for each wash. The product was dried by heating to give 870 parts of a clear, slightly tacky resinous alcohol. A mixture of 153 parts of this resin and 41 parts of phthalic anhydride was stirred at 170-175° C. for 1¾ hours to give a hard resin having an acid value of 68 and a softening point of 66° C.

*Example VIII*

To 1140 parts of p,p'-isopropylidenediphenol dissolved in 1500 parts of water containing 320 parts of caustic soda was added 513 parts of bis (beta-chloroisopropyl ether) and the reaction mixture was raised to 150° C. and held at this temperature for 7 hours (a closed pressure reactor provided with agitation was required for this preparation). The mixture was cooled to 98° C. and removed from the reaction vessel. The mixture was acidified by adding 200 parts of 37% hydrochloric acid. After stirring for 30 minutes the water layer was removed by decantation and the product washed 3 times with hot water in the usual manner. This intermediate resinous product was dried by heating to 130° C. to give 1350 parts of a soft resin.

To a constantly agitated solution of 716 parts of this resinous product dissolved in 500 parts of water containing 100 parts of caustic soda was added 161 parts of ethylene chlorohydrin over a period of 17 minutes at 85-88° C. The temperature was maintained at 90-95° C. for 2 hours when 60 parts of 37% hydrochloric acid was added and the reaction mixture stirred an additional hour at 90-95° C. Then the aqueous layer was decanted and the product washed 4 times using 1500 parts of hot water for each wash. The product was dried by heating to 130° C. to give 762 parts of a tacky resinous polyhydric alcohol.

201 parts of this resinous polyhydric alcohol was stirred at 170-180° C. with 31 parts of maleic anhydride yielding a hard, clear resin having an acid value of 54.

All the resinous esters of the preceding examples are readily soluble in alkaline media. The resins produced in accordance with the procedures set forth in Examples I through VIII are suitable for use in blends with wax emulsions for formulating self-polishing protective coating compositions which have the desired balance of water resistance for non-permanent type coatings. It is necessary that the resins of this invention be soluble in the various alkaline materials which have been found advantageous in formulating non-permanent type protective coating compositions. These alkaline materials include aqueous solutions of borax, ammonia, amines, and sodium hydroxide. A convenient method of dissolving the resinous synthetic esters is to add the aqueous alkali after the last step in preparing the resin, i.e., following the step of washing with hot water so that the resin is still in the molten state. Where the resin has been freed from water after its preparation and washing and has been allowed to cool to room temperature, it is preferred that it be pulverized before the addition of the hot aqueous alkali. Solutions of the synthetic resins prepared in this manner have been found to be stable in storage for prolonged periods.

The resinous synthetic esters herein described are completely miscible with shellac and often are used therewith in the formulation of self-polishing protective coatings. The resins may be conveniently blended with shellac by dissolving both materials simultaneously in an aqueous alkali solution, or alkaline solutions of each of the materials may be made individually and introduced together in a product formulation. The resinous synthetic esters are conveniently blended with wax emulsions by first preparing the alkali solutions of the former and mixing the same directly with the wax emulsions.

It may be sometimes desirable to use certain resins other than shellac along with the resinous synthetic esters in the formulation of self-polishing protective coatings. Such resins are illustrated by the ester gum and terpene phenolic types which have been found to be sufficiently miscible with waxes so that they may be incorporated in the final formulation.

In the following examples illustrating the preparation of typical non-permanent type coating compositions, the expressed proportions are by weight unless otherwise indicated.

Example IX

An alkali solution of shellac for use with the resins of this invention was prepared by adding 25.7 parts of shellac to a continuously stirred solution containing 68.7 parts of water and 5.6 parts of borax at 60 to 65° C. Sufficient water was subsequently added to give a non-volatile content of 25%

A wax emulsion was prepared by adding to a molten mixture of 61.7 parts of oxidized microcrystalline wax and 26.5 parts of a terpene phenolic resin (softening point 150–160° C.) at 150° C., 11.8 parts of oleic acid and thoroughly mixing the resulting composition. To this mixture at 105–110° C. was added 4 parts of triethanolamine and 5 parts of 48% caustic soda, the temperature being maintained with intermittent stirring, for 15 minutes. This mixture was then poured in a slow, steady stream into 745 parts of water at 94–98° C. with rapid agitation to give an emulsion (12.5% non-volatile) which was then rapidly cooled to 28° C. or less.

An aqueous borax solution of the resinous synthetic ester prepared in accordance with Example I may be made up by adding 16.8 parts of the synthetic ester to 130 parts of water which contains 4.2 parts of commercial borax. The temperature is adjusted to 85° C. and the composition stirred until a clear solution is obtained (about 15 minutes).

A self-polishing floor finish was obtained by mixing 50 parts of the borax solution of the resin with 25 parts of the shellac solution described above, 25 parts of water and 28.2 parts of the wax emulsion prepared as described.

Example X 16.8 parts of the resinous synthetic ester of Example II was added to 130 parts of water containing 4.2 parts of commercial borax. After adjusting the temperature to 85° C. and stirring for about 15 minutes, a clear solution was obtained. A self-polishing floor finish was produced by mixing 50 parts of this solution with 25 parts of the shellac solution prepared as described in Example IX, 25 parts of water, and 28.2 parts of the wax emulsion also described in Example IX.

Example XI 16.8 parts of the resinous synthetic ester of Example III was added to 130 parts of water containing 4.2 parts of commercial borax. After adjusting the temperature to 85° C. and stirring for about 15 minutes, a clear solution was obtained. A self-polishing floor finish was produced by mixing 50 parts of this solution with 25 parts of the shellac solution prepared as described in Example IX, 25 parts of water, and 28.2 parts of the wax emulsion also described in Example IX.

Example XII

A satisfactory self-polishing floor finish was obtained by repeating the procedure described in Example IX with the exception that the resinous synthetic ester of Example VIII was substituted for that of Example I.

Example XIII

A wax emulsion was prepared by adding 4.8 parts of oleic acid to 45 parts of melted carnauba wax and adjusting the temperature to 105° C.; 5.1 parts of triethanolamine and 3 parts of 30% caustic soda were then added and the mixture was maintained at 105 to 110° C. for 15 minutes with intermittent stirring. This mixture was added in a slow stream to 306 parts of water at 94–98° C. with rapid agitation. After the addition was complete, the emulsion was rapidly cooled to less than 28° C. and water was added to provide a non-volatile content of 12.5%.

To 131 parts of water heated to 75° C. was added 18.7 parts of the resinous synthetic ester of Example III and 2.7 parts of 28% ammonia. The resulting mixture was stirred until a clear solution was obtained. A self-polishing floor finish was obtained by mixing this solution with 42 parts of the carnauba wax emulsion prepared as described hereinabove.

Example XIV 18.7 parts of the resin of Example VI was added to 131 parts of water heated to 75° C. and 2.7 parts of 28% ammonia. Stirring resulted in a clear solution. Mixing this solution with 42 parts of a carnauba wax emulsion, prepared as described in Example XIII, yielded a superior self-polishing floor finish.

Example XV 18.7 parts of the resin of Example VII was added to 131 parts of water heated to 75° C. and 2.7 parts of 28% ammonia. Stirring resulted in a clear solution. Mixing this solution with 42 parts of a carnauba wax emulsion, prepared as described in Example XIII, yielded a superior self-polishing floor finish.

In the exemplified compositions, other vegetable waxes may be substituted for carnauba. Such waxes include ouricuri, candelilla and sugar cane wax. The oxidized microcrystalline wax of the examples may be modified by adding paraffin or certain montan waxes.

As shown in the examples, the resins of this invention may be used to replace shellac in whole or in part and the ratio of the resin or the resin and shellac to the wax emulsion base may vary from 1 to 4 to 9 to 1. Further, the solids content of the coating composition may be as low at 6% and up to about 20% and provide superior finishes.

The self-polishing compositions illustrated hereinabove provide coatings which give a smooth glossy surface after less than 30 minutes drying time at normal temperatures on usual flooring such as linoleum, asphalt tile, vinyl tile, and rubber tile. These coatings may be satisfactorily damp mopped after drying overnight and may be readily removed by mopping with alkaline cleaners.

The subject resins have been found to be particularly advantageous ingredients in formulating products which give floor coatings having a high degree of water resistance yet readily removed by mopping with aqueous alkali cleaners. These resinous synthetic esters also contribute to the self-polishing coatings unusually good flow characteristics so that the films formed therefrom are glass-like in smoothness, being perfectly free from any pitting or orange peel surface effect. An unusually high gloss is obtained from floor coatings of these materials, and it remains even after several damp moppings. The gloss-contributing characteristics of the resinous synthetic esters are such that high gloss finishes are obtained even when the non-volatile content of self-polishing floor coatings formulated therefrom is as low as 7 or 8%, whereas much higher non-volatile contents are usually required in order to get satisfactory gloss from the conventional self-polishing floor finishes. Self-polishing floor finishes formulated by blending the resinous synthetic ester with waxes are unusually clear and free from haze indicating good miscibility of actual dried film contituents and a freedom from forming insoluble film constituents on aging. It has been observed that self-polishing floor coatings, based on the use of blends of these resins with other polish ingredients, give films which are unusually free from the water spotting so common to many commercial non-permanent type floor coating materials.

The above-disclosed are but a limited number of embodiments of the product of the invention herein presented, for it is possible to produce still other embodiments without departing from the inventive concept herein disclosed, and it is desired therefore that only such limitations be imposed on the appended claims as are stated therein, or required by the prior of art.

I claim:
1. An alkali soluble resinous ester of a polyhydric alcohol and a dicarboxylic acid, said polyhydric alcohol having the general formula

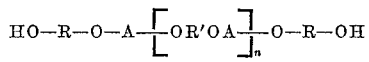

wherein R is a radical of 2 to 12 carbon atoms selected from the group consisting of divalent aliphatic hydrocarbon radicals and divalent aliphatic oxa-hydrocarbon radicals, any substituent groups being only —OH in a position beta to the valences of the radical; R' is a radical of 2 to 10 carbon atoms selected from the groups consisting of divalent aliphatic hydrocarbon radicals and divalent aliphatic oxa-hydrocarbon radicals any substituent groups being only —OH in a position beta to the valences of the radical; A is at least one member selected from the group consisting of arylene and alkylidene diarylene radicals and $n$ has a value of 0–2, said resinous ester having an acid value of greater than 40 and less than 100.

2. A self-lustering protective coating composition comprising water and a film-forming agent, the film-forming agent including an alkali soluble resinous ester of a polyhydric alcohol and a dicarboxylic acid, said polyhydric alcohol having the general formula

wherein R is a radical of 2 to 12 carbon atoms selected from the group consisting of divalent aliphatic hydrocarbon radicals and divalent aliphatic oxa-hydrocarbon radicals, any substituent groups being only —OH in a position beta to the valences of the radical; R' is a radical of 2 to 10 carbon atoms selected from the group consisting of divalent aliphatic hydrocarbon radicals and divalent aliphatic oxa-hydrocarbon radicals any substituent groups being only —OH in a position beta to the valences of the radical; A is at least one member selected from the group consisting of arylene and alkylidene diarylene radicals and $n$ has a value of 0–2, said resinous ester having an acid value of greater than 40 and less than 100.

3. The alkali-soluble resinous ester of claim 1 wherein the polyhydric alcohol is

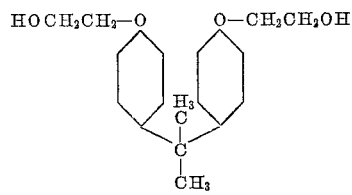

4. The alkali-soluble resinous ester of claim 1 wherein the polyhydric alcohol is

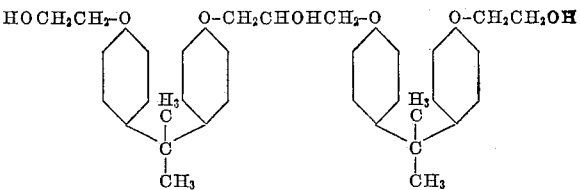

5. The alkali-soluble resinous ester of claim 1 wherein the polyhydric alcohol is

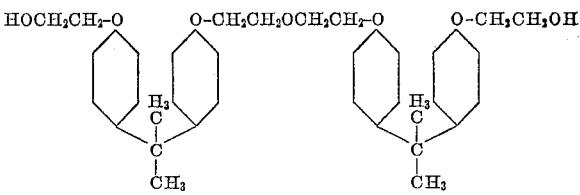

6. The alkali-soluble resinous ester of claim 1 wherein the polyhydric alcohol is

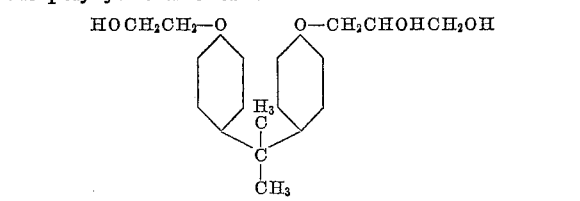

7. The alkali-soluble resinous ester of claim 1 wherein the polyhydric alcohol is

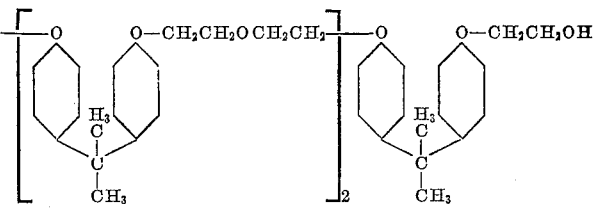

8. The self-lustering protective coating composition of claim 2 wherein the polyhydric alcohol is

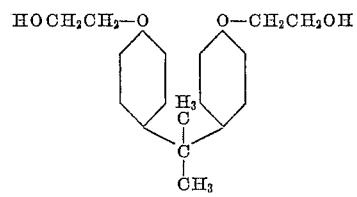

9. The self-lustering protective coating composition of claim 2 wherein the polyhydric alcohol is

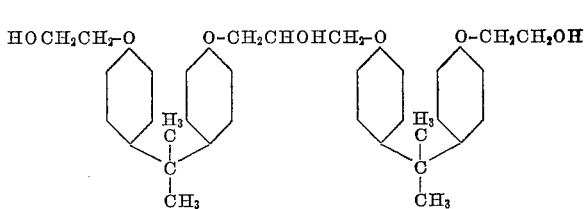

10. The self-lustering protective coating composition of claim 2 wherein the polyhydric alcohol is

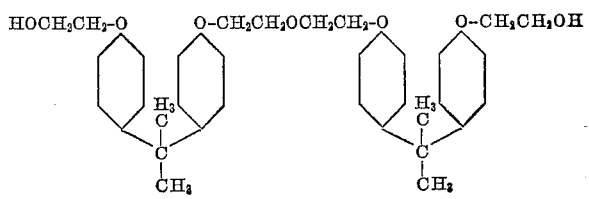

11. The self-lustering protective coating composition of claim 2 wherein the polyhydric alcohol is
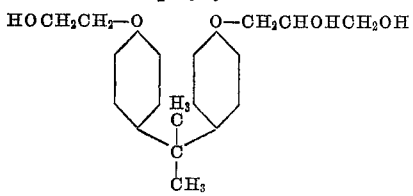
12. The self-lustering protective coating composition of claim 2 wherein the polyhydric alcohol is
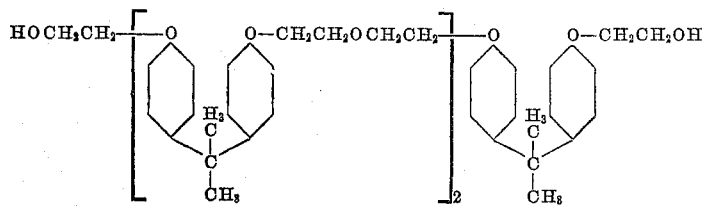
References Cited in the file of this patent
UNITED STATES PATENTS
| | | |
|---|---|---|
| 2,324,483 | Castan | July 20, 1943 |
| 2,503,726 | Greenlee | Apr. 11, 1950 |
| 2,558,949 | Greenlee | July 3, 1951 |
| 2,593,411 | Caldwell | Apr. 22, 1952 |
| 2,686,164 | Arvin et al. | Aug. 10, 1954 |